Patented Nov. 6, 1934

1,980,030

UNITED STATES PATENT OFFICE 1,980,030

PROCESS FOR ISOLATING OR PURIFYING TERPENE ALCOHOLS AND HYDROAROMATIC ALCOHOLS

John William Blagden, Loughton, and Walter Edward Huggett, London, England, assignors of one-third to Howards & Sons Limited, Ilford, England, a British company No Drawing. Application December 23, 1932, Serial No. 648,719. In Great Britain January 4, 1932

12 Claims. (Cl. 260—153)

In the specification of United States Letters Patent, No. 1,932,131, granted October 24, 1933, we have described a process for the isolation or purification of menthol or its stereoisomers, whether optically active or optically inactive, which is based on the capacity of these compounds for forming crystalline addition products with phosphoric acid.

The present invention consists in a similar process for the separation of other terpene alcohols and hydroaromatic alcohols from their mixtures with one another or with other substances (whether for the purpose of isolating or purifying the alcohols or for the purpose of isolating or purifying other substances mixed with the alcohols), based on the capacity for forming addition products with ortho-phosphoric acid which, as we have shown in the specification of United States Letters Patent, No. 1,959,228, granted May 15, 1934, is also possessed by these alcohols.

The procedure for separating the terpene alcohols or hydroaromatic alcohols from their mixtures with one another or with other substances is analogous to that described in the specification of United States Letters Patent No. 1,932,131 referred to above for separating menthols from their mixtures with one another or with other substances.

When the mixture contains only one terpene or hydroaromatic alcohol, it suffices to convert the alcohol into its phosphoric acid addition compound and to separate the latter from the portion of the mixture which has not combined with phosphoric acid; the addition compound may then be decomposed, if desired after it has been purified, in order to liberate the alcohol.

When the mixture consists of or contains two or more terpene or hydroaromatic alcohols, the treatment with phosphoric acid will lead to a mixture of phosphoric acid addition compounds, from which one of the addition compounds may be isolated by taking advantage of their differing physical properties, such as their solubilities.

When the object is to isolate or purify a substance containing as an admixture or impurity one or more terpene or hydroaromatic alcohols, it is only necessary to convert the alcohol or alcohols into the phosphoric acid addition compound or compounds and to remove the latter, and it will be understood that in this case decomposition of the addition compound is not essential to the invention, although it will generally be desirable, for reasons of economy, in order to recover the alcohol.

By conducting the treatment with phosphoric acid in presence of an organic solvent, such as petroleum ether, the phosphoric acid addition compounds in many cases separate in crystalline form and can be removed or isolated by filtering. In the treatment of a mixture containing two or more terpene or hydroaromatic alcohols, the choice of a solvent in which the solubilities of the addition compounds of the several alcohols differ sufficiently, if required, in conjunction with cooling, may lead to the crystallization of one addition compound in a more or less pure form, the other or others remaining substantially wholly in solution.

In other cases, the addition compound may be isolated or purified by removing the other constituents of the reaction mixture by distillation, which should be conducted at as low a temperature as possible in view of the tendency of the addition compounds to decompose when heated. It is also possible to separate the addition compound from other constituents of the reaction mixture by extraction with solvents.

The invention is applicable, for instance, to the purification of crude borneol, such as is obtained by saponification of crude bornyl acetate, to the separation of borneol and isoborneol, to the purification of cyclohexanone or methylcyclohexanone containing some cyclohexanol or methylcyclohexanol or, vice versa, to the purification of cyclohexanol or methylcyclohexanol containing some corresponding ketone. A further application of the invention is to the separation, from unchanged camphene, of the products of the hydration of camphene, such as are obtainable, for example, according to the process described in Annalen der Chemie (1880), vol. 200, page 354 or in American Chemical Abstracts (1930), vol. 24, page 1636. Furthermore, in the manufacture of camphor from borneol it may sometimes be desirable to interrupt the reaction whilst the reaction mass still contains some borneol, and the invention offers a convenient means of separating unchanged borneol from the camphor.

The following examples illustrate the invention:—

1. 500 grams of crude borneol, such as is obtained by the saponification of crude bornyl acetate, and containing only 77 per cent. borneol, are dissolved in 2000 cc. of petroleum ether and the solution is filtered to remove inorganic matter and dried. The solution is then cooled and 320 grams of ortho-phosphoric acid of 100 per cent. strength (super-cooled) are slowly run in, whilst well stirring. Formation of crystals of the phosphoric acid compound immediately commences. Stirring is continued for a short time after all the said acid has been added in order to complete the mixing. The crystalline deposit is filtered and washed with a little petroleum ether. A yield of 630 grams of the compound is obtained; when decomposed with water, they yield 385 grams of borneol (a yield of 77 per cent. of the original mixture), having a melting point of 211° C. and showing on analysis a content of borneol of 100 per cent.

2. In the commercial manufacture of camphor from borneol it may sometimes be advisable to stop the reaction whilst the mass still contains some borneol. 250 grams of a product so obtained, containing about 10 per cent. of borneol, are dissolved in 1000 cc. of petroleum ether and to the solution are added, whilst cooling and stirring, 40 grams of ortho-phosphoric acid of 100 per cent. strength (super-cooled). The whole is allowed to stand for several hours, during which time deposition of crystals occurs. When crystallization is complete, the solid matter is separated and decomposed; it yields 22 grams of borneol, representing 8.8 per cent. of the original mixture. The mother liquor is washed with dilute caustic soda solution to remove traces of acid, and the solvent is then removed, whereby there are obtained 220 grams of camphor which, after recrystallization from aqueous alcohol, melts at 172° C.

3. 100 grams of a mixture consisting of 35 per cent. of borneol and 65 per cent. of camphene is mixed with 200 cc. of petroleum ether, and the solution obtained is treated with 22 grams of ortho-phosphoric acid in a manner similar to that described in Example 1. The solid phosphoric acid compound of borneol which separates is decomposed with water and yields 35 grams of borneol having a melting point of 198° C.

4. 150 grams of a product obtained by dehydrogenation of cyclohexanol, consisting of 70 per cent. of cyclohexanone and 30 per cent. of cyclohexanol, is mixed with 20 grams of ortho-phosphoric acid, whilst cooling, whereby there is formed a homogeneous solution. The solution is distilled under a pressure of 2 mm. of mercury at a maximum temperature of 47° C. The distillate consists of 100 grams of cyclohexanone of 93.5 per cent. purity. The phosphoric acid compound of cyclohexanol is partly decomposed into its constituents at the temperature necessary for distillation of the cyclohexanone, and as a consequence a small quantity of cyclohexanol distils with the cyclohexanone.

5. 100 grams of commercial pine oil, containing about 70 per cent. of terpineol, is mixed with 400 cc. of petroleum ether, and the mixture is brought by cooling and stirring to a temperature of —5° C. 15 grams of ortho-phosphoric acid are then slowly added; this quantity of acid is sufficient to convert all the terpineol into its phosphoric acid compound, which is very soluble in the petroleum ether. In order to remove the compound, it is extracted with ortho-phosphoric acid; for this purpose, 30 grams of ortho-phosphoric acid are added to the cold solution, whilst stirring, and the supernatant layer of petroleum ether containing the residue of the pine oil is removed by decantation. The phosphoric acid compound of terpineol contained in the phosphoric acid layer is decomposed by treatment with ice and water, and the liberated terpineol is separated. A small quantity of terpene hydrate is formed during this operation and is worked up separately. There are obtained 65 grams of crude terpineol having a specific gravity of 0.936 at 15° C., and distilling at 4 mm. pressure between 79–83° C.

6. 50 grams of a mixture of equal parts of commercial borneol and commercial fenchyl alcohol are dissolved in 200 cc. of petroleum ether of boiling range 60–80° C., the solution is cooled to —5° C. and there are added to it, whilst stirring, 22.5 grams of phosphoric acid of 100 per cent. strength. After some time, crystals commence to separate; the mixture is stirred for 10 minutes, its temperature is allowed to rise to 15° C. and the crystals are removed by filtration. 27 grams of a phosphoric compound are thus obtained which, on decomposition, yield 16 grams of borneol having a melting point of 207.5° C. From the filtrate 32 grams of an impure fenchyl alcohol can be recovered.

7. 40 grams of an impure mixture of borneol and isoborneol containing 60–70 per cent. of isoborneol are dissolved in 150 cc. of benzene. The solution is cooled to —5° C. and there are slowly added at this temperature 26 grams of ortho-phosphoric acid of 100 per cent. strength; crystals immediately commence to separate. The temperature is allowed to rise to about 15° C. and the crystals are separated by filtration. There are obtained 47 grams of the phosphoric acid addition compound of isoborneol which, when decomposed, yield 26 grams of isoborneol of melting point 213.5° C. From the benzene solution, 10 grams of an impure borneol (melting point 196° C.) can be recovered.

Having thus described the nature of the said invention and the best means we know of carrying the same into practical effect, we claim:—

1. A process for separating an alcohol selected from the class consisting of the terpene alcohols and hydroaromatic alcohols other than menthols from a mixture of such alcohol with at least one other substance, which process comprises converting the alcohol in the mixture into its ortho-phosphoric acid addition compound and separating from one another the addition compound and the remainder of the mixture.

2. A process for separating an alcohol selected from the class consisting of the terpene alcohols and hydroaromatic alcohols other than menthols from a mixture comprising at least two such alcohols, which process comprises converting the alcohols in the mixture into their ortho-phosphoric acid addition compounds, isolating one of the addition compounds thus formed, decomposing the isolated addition compound and recovering the liberated alcohol.

3. A process for separating an alcohol selected from the class consisting of the terpene alcohols and hydroaromatic alcohols other than menthols from a mixture of such alcohol with at least one other substance, which process comprises converting the alcohol in the mixture into its ortho-phosphoric acid addition compound, in presence of an organic solvent in which the addition compound is sparingly soluble, and separating the addition compound from the reaction mixture.

4. A process for separating an alcohol selected from the class consisting of the terpene alcohols and hydroaromatic alcohols other than menthols from a mixture comprising at least two such alcohols, which process comprises converting the alcohols in the mixture in their ortho-phosphoric acid addition compounds, in presence of an organic solvent in which only one of the addition products formed is sparingly soluble, separating the sparingly soluble addition product from the reaction mixture, decomposing it into its constituents and recovering the liberated alcohol.

5. A process for separating an alcohol selected from the class consisting of the terpene alcohols and hydroaromatic alcohols other than menthols from a mixture of such alcohol with at least one other substance, which process comprises converting the alcohol in the mixture into its ortho-phosphoric addition compound and separating from one another by distillation the addition compound and the remainder of the mixture.

6. A process for separating an alcohol selected from the class consisting of the terpene alcohols and hydroaromatic alcohols other than menthols from a mixture of such alcohol with at least one other substance, which process comprises converting the alcohol in the mixture into its ortho-phosphoric acid addition compound and separating from one another by extraction with a solvent the addition compound and the remainder of the mixture.

7. A process for purifying crude camphor containing borneol, which comprises mixing together the crude camphor and ortho-phosphoric acid, separating from the reaction mixture the phosphoric acid addition compound of borneol thus formed and recovering camphor from the remaining portion of the reaction mixture.

8. A process for separating borneol from a mixture of borneol and camphene, which comprises mixing together the mixture and ortho-phosphoric acid, isolating from the reaction mixture the phosphoric acid addition compound of borneol thus formed, isolating the addition compound from the reaction mixture and decomposing it into its constituents.

9. A process for isolating terpineol from commercial pine oil, which comprises mixing the oil with ortho-phosphoric acid, isolating from the reaction mixture the phosphoric acid addition compound of terpineol thus formed, and decomposing it into its constituents.

10. A process for purifying crude camphor containing borneol, which comprises mixing together the crude camphor, ortho-phosphoric acid and petroleum ether, separating the liquid from the crystals which form and recovering camphor from the liquid.

11. A process for separating borneol from a mixture of borneol and camphene, which comprises mixing together the mixture, ortho-phosphoric acid and petroleum ether, separating the crystals which form, decomposing them and recovering the liberated borneol.

12. A process for isolating terpineol from commercial pine oil, which comprises mixing the oil with ortho-phosphoric acid and petroleum ether, extracting by means of phosphoric acid the addition compound of phosphoric acid and terpineol thus formed and recovering terpineol from the extract so obtained.

JOHN WILLIAM BLAGDEN.
WALTER EDWARD HUGGETT.